(No Model.)
W. H. BAILEY.
RELIEF VALVE FOR STEAM CYLINDERS.
No. 508,593. Patented Nov. 14, 1893.
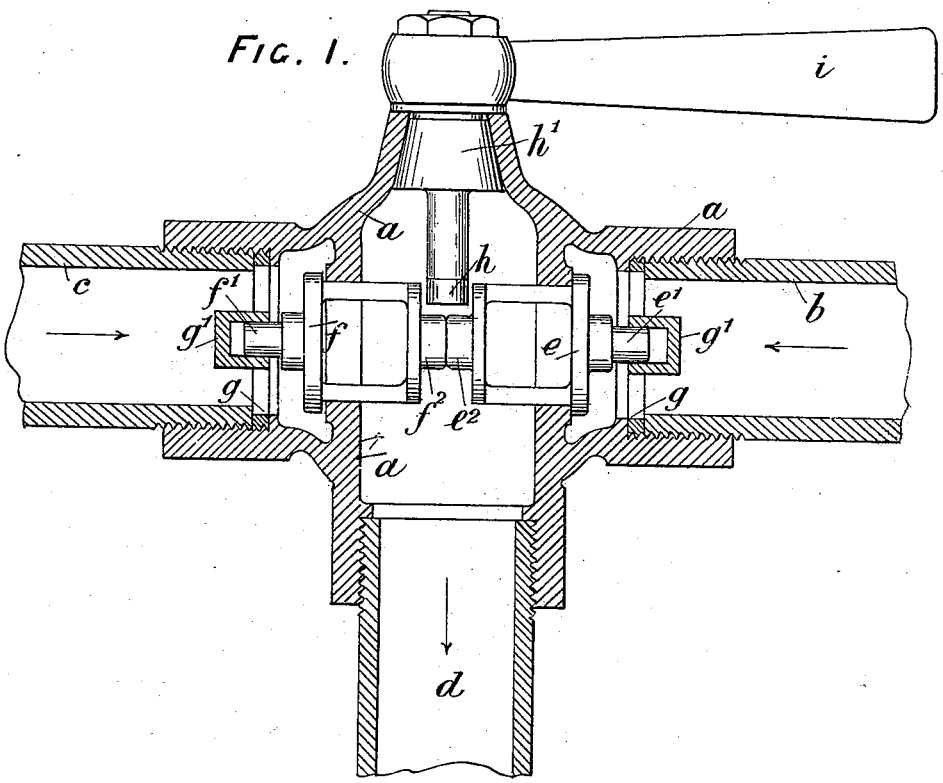
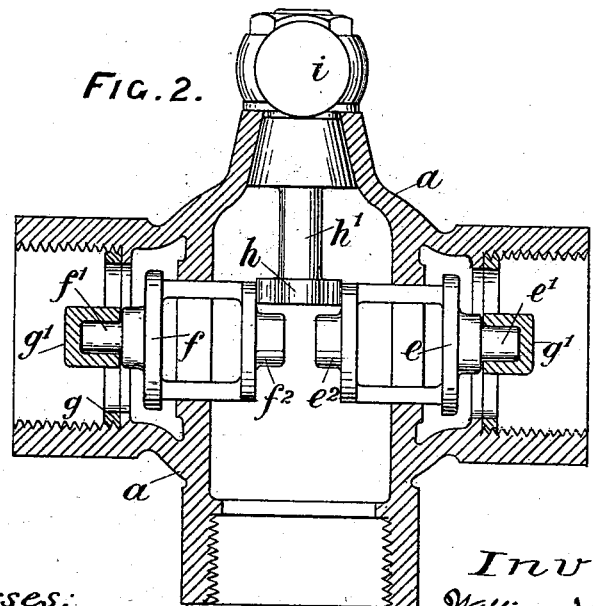
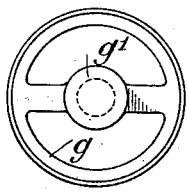
Witnesses:
E. B. Bolton
E. K. Sturtevant
Inventor:
William Henry Bailey
By Richards
his Attorneys.

UNITED STATES PATENT OFFICE.

WILLIAM H. BAILEY, OF SALFORD, ENGLAND.

RELIEF-VALVE FOR STEAM-CYLINDERS.

SPECIFICATION forming part of Letters Patent No. 508,593, dated November 14, 1893.

Application filed February 17, 1893. Serial No. 462,761. (No model.) Patented in England November 26, 1892, No. 21,588.

*To all whom it may concern:*

Be it known that I, WILLIAM HENRY BAILEY, a subject of the Queen of Great Britain, and a resident of Salford, in the county of Lancaster, England, have invented certain new and useful Improvements in Relief-Valves for Steam-Cylinders, (for which I have obtained Letters Patent in Great Britain, No. 21,588, dated November 26, 1892,) of which the following is a specification.

My invention relates to improvements in relief valves for preventing injury to steam cylinders arising from an accumulation of water therein, and the objects of my improvements are to enable both valves to be held open for a few moments after starting an engine, and further to dispense with the use of springs in such valves. I attain these objects by the mechanism illustrated on the accompanying sheet of drawings in which—

Figure 1 is a sectional elevation of my improved relief valves showing one valve closed by the steam pressure and the other open for the exhaust of the steam cylinder to which the valves are applied. Fig. 2 is a similar view to Fig. 1 but showing both valves held open. Fig. 3 is a detail view showing one of the parts detached.

In the views, $a$ designates the valve chamber or casing, $b$ a pipe secured to the casing $a$ and leading to the steam or pressure end of the cylinder (not shown) and $c$ a pipe secured to the casing $a$ and leading to the exhaust end of the cylinder. $d$ is a waste pipe also secured to the casing $a$.

$e\,f$ are the pair of relief valves the stems $e'\,f'$ of which enter sockets $g'$ supported by ring galleries $g$ one of which is shown detached in Fig. 3. Each gallery $g$ is screwed into one of the threaded sockets of the casing $a$, and each stem $e'$ or $f'$ is accurately fitted to its socket $g'$. Between the two valves is a double tappet $h$ the spindle $h'$ of which is enlarged and fitted to the casing $a$ through which it passes and on the spindle $h'$ is fixed a handle $i$. The valves $e$ and $f$ are of such a length that when one valve say the valve $e$ as in Fig. 1 is closed its rear end $e^2$ abuts against the rear end $f^2$ of the valve $f$ and holds it open so that as the pressure of steam, admitted alternately at each end of the cylinder, closes one valve the other is thereby opened. On starting the engine both valves $e\,f$ may be opened simultaneously by turning the handle $i$ a quarter turn and so moving the double tappet $h$ into the position shown in Fig. 2; and when all the water has escaped from the cylinder into the waste pipe $d$ the handle $i$ must be turned back to the position shown in Fig. 1. The valves $e\,f$ then work automatically, opening and shutting alternately, and allow the water to be expelled from each end of the cylinder alternately. The stems $e'\,f'$ being accurately fitted to the sockets $g'$ the air confined in the latter acts as a pneumatic check to cushion the opening valve.

In applying the relief valves to a vertical cylinder the pipes $b$ and $c$ would be connected by bends to the top and bottom of the cylinder so that the valves might occupy a horizontal position as shown.

Having now particularly described and ascertained the nature of my said invention and in what manner the same is to be performed, I declare that what I claim, and desire to secure by Letters Patent of the United States, is—

In combination, the casing the pipe connections $b, c, d$, the two valves having stems $e', f'$, the double tappet $h$, with means for operating the same, the air cushions for the valve stems comprising the cup shaped sockets $g'$ and the ring galleries $g$ carrying said sockets said galleries being seated in the casing at the ends of the pipe connections, substantially as described.

In witness whereof I have hereunto set my hand in presence of two witnesses.

W. H. BAILEY.

Witnesses:
H. B. BARLOW,
HERBERT R. ABBEY.